Aug. 14, 1923.

R. L. FROME

REENFORCED CHEESE BOX

Filed Nov. 18, 1922

1,464,651

Inventor
R. L. Frome
By Watson E. Coleman
Attorney

Patented Aug. 14, 1923.

1,464,651

UNITED STATES PATENT OFFICE.

REINHARD L. FROME, OF SHEBOYGAN, WISCONSIN.

REENFORCED CHEESE BOX.

Application filed November 18, 1922. Serial No. 601,759.

*To all whom it may concern:*

Be it known that I, REINHARD L. FROME, a citizen of the United States, residing at Sheboygan, in the county of Sheboygan and State of Wisconsin, have invented certain new and useful Improvements in Reenforced Cheese Boxes, of which the following is a specification, reference being had to the accompanying drawings.

This invention relates to receptacles, and particularly to cheese boxes.

The general object of the invention is to so construct the cheese box that it shall have maximum strength and at the same time be readily assembled and nailed, and further to so construct the cheese box that the cover may be readily put in place and nailed to the body of the box, this cover, however, being readily disengageable from the body of the box when necessary.

Other objects will appear in the course of the following description.

My invention is illustrated in the accompanying drawings, wherein:—

Figure 1:
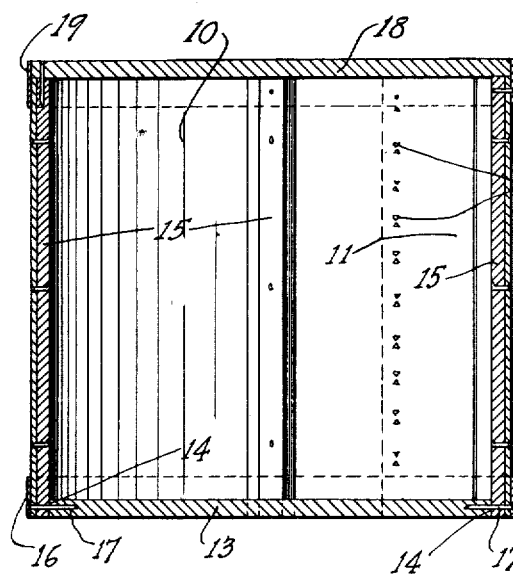
Figure 1 is a vertical sectional view through a cheese box constructed in accordance with my invention.
Figure 2:
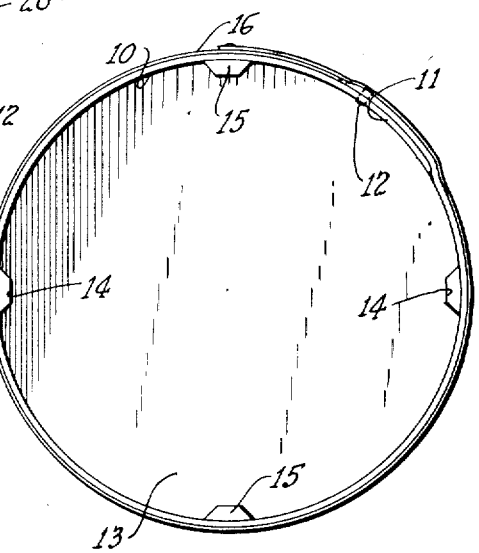
Figure 2 is a top plan view of the box shown in Figure 1 with the lid or cover removed.
Figure 3:
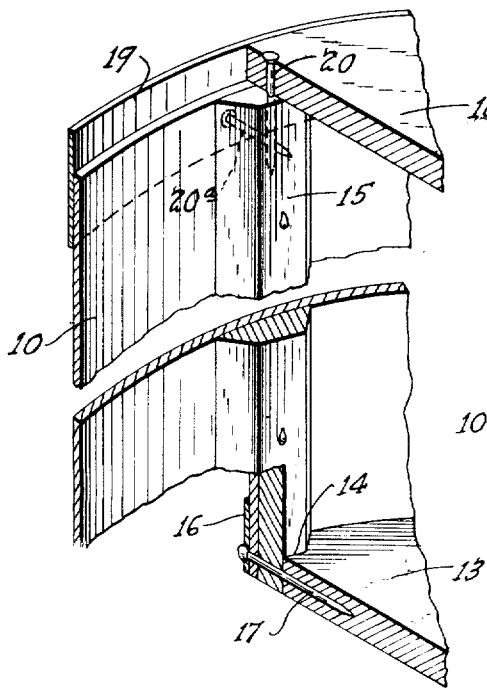
Figure 3 is a fragmentary sectional perspective view through the cheese box shown in Figure 1.

Referring to these drawings, it will be seen that the body 10 of the box is made of the usual veneer. This veneer may be in the form of one or more plies or sheets of wood but, as illustrated, there is only one sheet of veneer used, this veneer preferably overlapping at 11 and the overlapping portions of the veneer being held by the staples or like devices 12. The bottom 13 of the box may be formed of one or more sections of wood or equivalent material and is circular in form and this bottom is cut out at a plurality of points along its periphery at 14.

Attached, as by nails, to the inner face of the body 10 are a plurality of vertical reinforcing bars 15 having any desired shape in cross section, though preferably being relatively thin and having beveled side faces, these bars having a length equal at least to the full depth of the body from the top to the bottom thereof, and when the bottom is put in place these bars extend through the openings 14 which fit the cross sections of the bars. The rim 16 of the bottom of the box is formed of a thin strip of metal and is attached by nails, rivets or the like to the veneer forming the body of the box at its lower edge thereof. Nails 17 are driven through apertures in the rim 16 through the veneer forming the body 10 and into and preferably through the corresponding reinforcing bar 15 into the bottom 13 of the box, thus securing the body to the bottom very firmly. Preferably one of the bars 15 is located so that the nail driven through the outer overlapping portion of the rim 16 will pass through one of these bars. I do not wish to be limited to the number of these reinforcing bars, but in ordinary circumstances four of these bars will be used disposed in quartering relation to each other. Preferably the reinforcing bars 15 will terminate flush with the upper edge of the body 10.

The cover 18 will preferably be made of a circular piece of thin wood made in one or more sections as may be found desirable and provided with a depending rim 19 of metal, and this cover may be disposed over the top of the body so that the rim 19 will extend down over the upper margin of the body and the cover 18 will rest firmly upon the upper ends of the posts or bars 15. This construction permits nails 20 to be driven downward through the cover and into the upper ends of the posts 15, or nails may be driven, as also illustrated in Figure 1, through the rim 19, through the veneer forming the body of the box, and into the posts. Either or both sets of these nails 20 or 20$^a$ may be used for attaching the cover to the box and under these circumstances no matter how much the veneer may be split or wear the box will be sufficiently held together so as to properly enclose the contents.

Figure 4:
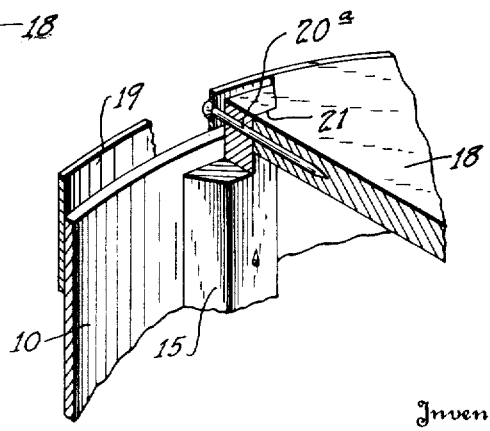
Figure 4 is a fragmentary sectional perspective view of like general character to Figure 3 but showing another method of connecting the cover to the box.

Under some circumstances, as illustrated in Figure 4, the cover 18 may be formed with apertures 21 to fit the upper ends of the posts and the upper ends of the posts may project into said apertures flush with the upper face of the cover. In this case, of course, the post will project slightly above the body 15 and in this case nails 20$^a$, in order to fasten the cover, will be driven through apertures in the rim 19 and into the upper ends of the posts. This construction, however, requires that the cover shall be more or less carefully fitted onto the cheese box in order to apply the cover. This takes time and makes it somewhat more difficult to put the cover on than it otherwise would.

It will be seen that the bottom and the top or cover each constitutes a head for the cheese box and that both these heads may be made alike, as in Figure 4, or different. Obviously I do not wish to be limited to the body of the box being made of one thickness of veneer or of one piece of veneer, as the upstanding posts or reinforcing bars will permit the body to be made of a number of pieces of veneer. A box constructed in accordance with my invention is very strong, will permit the transportation of relatively heavy articles, such as cheese, without any danger of breaking and without any danger of the cover accidentally becoming removed. The posts not only provide reinforcements for the cheese box but also provide for the firm attachment of the cover to the body of the box and for the firm attachment of the bottom to the body of the box. While the box is preferably made of wood, it is obvious that it may be made of other materials.

I claim :—

1. A box of the character described having a body and a head, the head fitting within the body and having apertures on its periphery at intervals, a plurality of reinforcing posts having their ends disposed in said apertures of the head, the reinforcing posts being nailed to the body and to said head.

2. A box of the character described having a body and a head, the head fitting within the body and having apertures on its periphery at intervals, a plurality of reinforcing posts having their ends disposed in said apertures of the head, a metallic rim extending around the exterior of the body at one end, and nails extending through said rim, through the body, and into the head, certain of said nails extending through said posts.

3. A cheese box comprising a body, longitudinally extending posts attached at intervals to the body on the inside face thereof, and a head having a rim fitting over the body, the head having apertures inward of the rim to receive said posts.

4. A box of the character described comprising a cylindrical body having longitudinally extending posts disposed at intervals on the inner face of the body and attached thereto and having a length equal to the length of the body, a bottom and top, each fitting said body and having a rim embracing the body, and nails extending through said top and bottom and into said posts.

5. A receptacle of the character described comprising a circular body, posts disposed at intervals against the inner face of the body and attached thereto and having a length equal to the length of the body, a bottom fitting within the body and having apertures fitting the posts and into which the posts extend, a metallic rim extending around the lower end of the body, nails extending through said metallic rim, through the body and said posts and into the bottom, and a cover fitting over the upper edge of the body and resting upon the upper edge of said posts, said cover having a downwardly extending metallic rim.

In testimony whereof I hereunto affix my signature.

REINHARD L. FROME.